United States Patent
Schultz et al.

(10) Patent No.: US 11,654,581 B2
(45) Date of Patent: May 23, 2023

(54) SYSTEMS AND METHODS FOR AN ARTICULATED SUCTION GRIPPER ASSEMBLY

(71) Applicant: AMP Robotics Corporation, Louisville, CO (US)

(72) Inventors: Carter J. Schultz, Lafayette, CO (US); Brian J. Leach, Denver, CO (US); Alexander C. Kee, Denver, CO (US); Matanya B. Horowitz, Golden, CO (US); Mark Baybutt, Superior, CO (US)

(73) Assignee: AMP Robotics Corporation, Louisville, CO (US)

( * ) Notice: Subject to any disclaimer, the term of this patent is extended or adjusted under 35 U.S.C. 154(b) by 344 days.

(21) Appl. No.: 16/856,825

(22) Filed: Apr. 23, 2020

(65) Prior Publication Data
US 2020/0338753 A1 Oct. 29, 2020

Related U.S. Application Data

(60) Provisional application No. 62/838,746, filed on Apr. 25, 2019.

(51) Int. Cl.
*B25J 15/06* (2006.01)
*B25J 15/04* (2006.01)
(Continued)

(52) U.S. Cl.
CPC ........... *B25J 15/0616* (2013.01); *B25J 9/003* (2013.01); *B25J 9/1612* (2013.01); *B25J 9/1697* (2013.01);
(Continued)

(58) Field of Classification Search
CPC .... B25J 15/0616; B25J 15/0658; B25J 15/04; B25J 15/0433; B25J 15/0491;
(Continued)

(56) References Cited

U.S. PATENT DOCUMENTS

| 4,604,787 A | 8/1986 | Silvers, Jr. |
| 4,707,013 A | 11/1987 | Vranish |

(Continued)

FOREIGN PATENT DOCUMENTS

| CN | 109058641 | 12/2018 |
| EP | 1129829 | 9/2001 |

(Continued)

OTHER PUBLICATIONS

International Searching Authority, "International Search Report and Written Opinion from PCT Application No. PCT/US2020/029579", from Foreign Counterpart to U.S. Appl. No. 16/856,825, filed Jul. 24, 2020, pp. 1 through 16, Published: WO.

(Continued)

*Primary Examiner* — Dean J Kramer
(74) *Attorney, Agent, or Firm* — Van Pelt, Yi & James LLP

(57) ABSTRACT

In one embodiment, a robotic system comprises: a robot comprising a robotic actuator and at least one robotic arm mechanically coupled to the robotic actuator; a suction gripper mechanism that comprises: a linear shaft element; an internal airflow passage within the linear shaft configured to communicate an airflow between an airflow application port at a first end of the linear shaft and a gripping port positioned at an opposing second end of the linear shaft; a suction cup assembly comprising a suction cup element coupled to the gripping port; and an actuator configured to rotate the linear shaft in order to articulate an orientation of the suction cup assembly.

17 Claims, 11 Drawing Sheets

(51) Int. Cl.
    *B25J 9/00*            (2006.01)
    *B25J 9/16*            (2006.01)
    *B25J 19/00*          (2006.01)
    *F16C 29/02*         (2006.01)
    *G05B 15/02*        (2006.01)
    *B25J 18/02*         (2006.01)

(52) U.S. Cl.
    CPC ........... *B25J 15/04* (2013.01); *B25J 15/0408* (2013.01); *B25J 15/0658* (2013.01); *B25J 15/0683* (2013.01); *B25J 18/025* (2013.01); *B25J 19/0058* (2013.01); *F16C 29/02* (2013.01); *G05B 15/02* (2013.01)

(58) Field of Classification Search
    CPC .. B25J 15/0408; B25J 9/1697; B25J 19/0058; B65G 47/914
    See application file for complete search history.

(56) References Cited

U.S. PATENT DOCUMENTS

| | | | | |
|---|---|---|---|---|
| 4,815,780 | A * | 3/1989 | Obrist | B25J 15/04 294/86.4 |
| 4,976,582 | A * | 12/1990 | Clavel | B25J 9/1065 108/138 |
| 5,462,311 | A | 10/1995 | Cipolla | |
| 6,343,415 | B1 * | 2/2002 | Okuda | H05K 13/0413 29/721 |
| 8,134,324 | B2 * | 3/2012 | Nishida | G05B 15/02 318/567 |
| 8,307,732 | B2 * | 11/2012 | Kinoshita | B25J 17/0266 901/19 |
| 8,615,123 | B2 | 12/2013 | Dabic | |
| 8,714,903 | B2 | 5/2014 | Feng | |
| 8,720,298 | B2 | 5/2014 | Lehmann | |
| 9,649,771 | B2 | 5/2017 | Mihara | |
| 10,207,296 | B2 | 2/2019 | Garcia | |
| 10,625,304 | B2 | 4/2020 | Kumar | |
| 10,710,119 | B2 | 7/2020 | Kumar | |
| 10,722,922 | B2 | 7/2020 | Kumar | |
| 2001/0019692 | A1 | 9/2001 | Ehrat | |
| 2012/0165106 | A1 | 6/2012 | Eltner | |
| 2014/0251058 | A1 | 9/2014 | Mihara et al. | |
| 2017/0232479 | A1 | 8/2017 | Pietzka | |
| 2019/0084012 | A1 | 3/2019 | McCoy, Jr. | |
| 2020/0290088 | A1 | 9/2020 | Kumar | |
| 2020/0368786 | A1 | 11/2020 | Kumar | |
| 2021/0229133 | A1 | 7/2021 | Kumar | |
| 2021/0346916 | A1 | 11/2021 | Kumar | |
| 2022/0016675 | A1 | 1/2022 | Kumar | |
| 2022/0023918 | A1 | 1/2022 | Kumar | |

FOREIGN PATENT DOCUMENTS

| | | |
|---|---|---|
| EP | 2301726 | 5/2012 |
| WO | 2009046761 A1 | 4/2009 |
| WO | 2016029299 A1 | 3/2016 |
| WO | 2018036634 | 3/2018 |
| WO | 2019060489 A2 | 3/2019 |

OTHER PUBLICATIONS

International Searching Authority, "International Search Report and Written Opinion from PCT Application No. PCT/US2020/027199", dated Jun. 15, 2020, pp. 1 through 12, Published: WO.

"Telescopic Wand—Friction Lock Top and Bottom", originally downloaded Mar. 27, 2019, p. 1, https://builtinvacuum.com/parts/all/accessories/extension-tubes/telescopic-wand-friction-lock/.

* cited by examiner

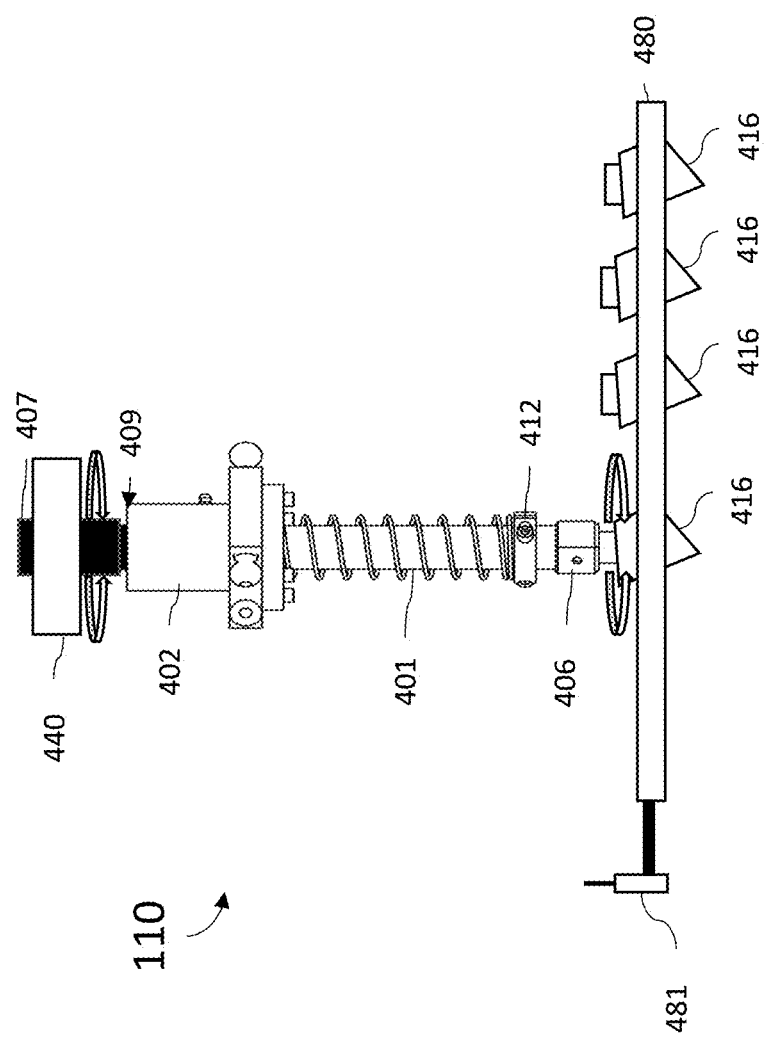

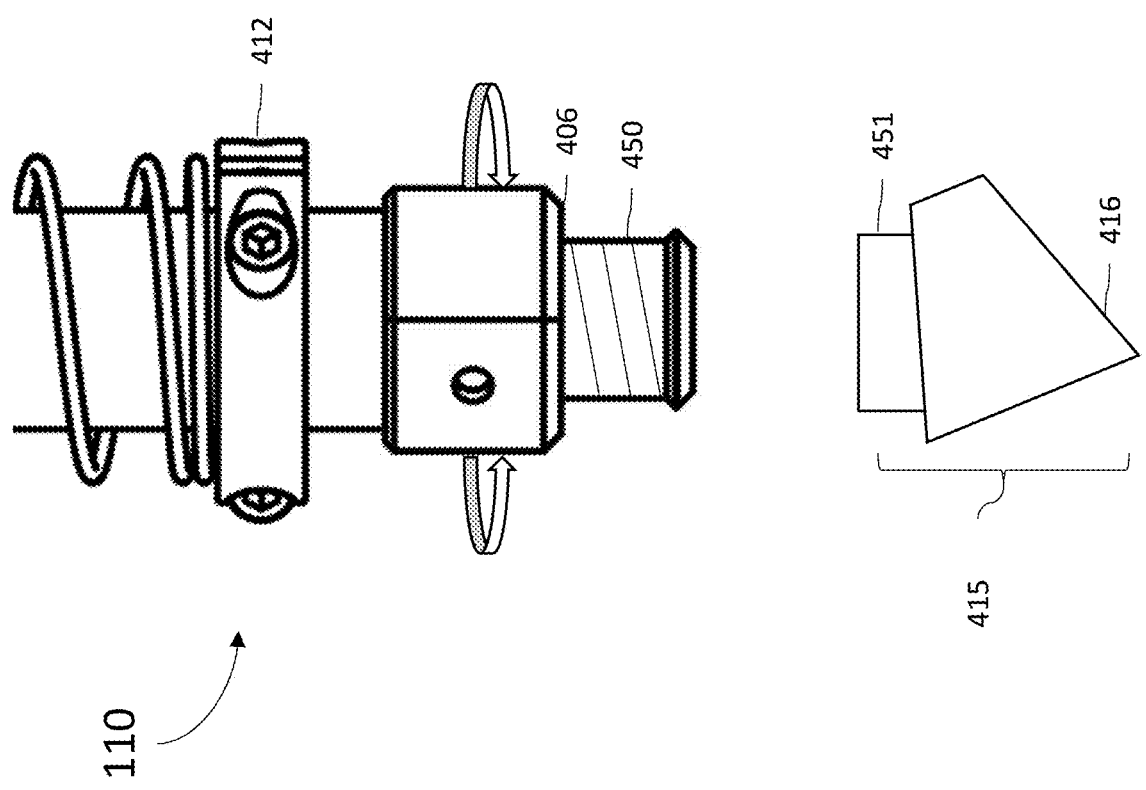

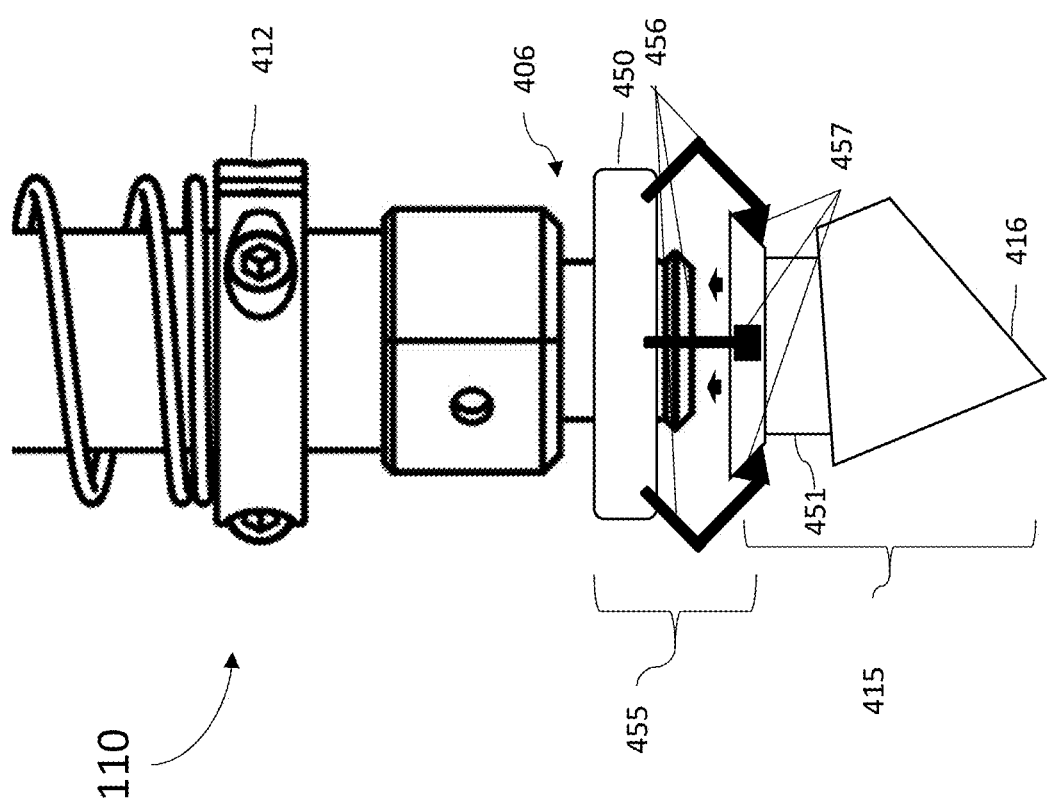

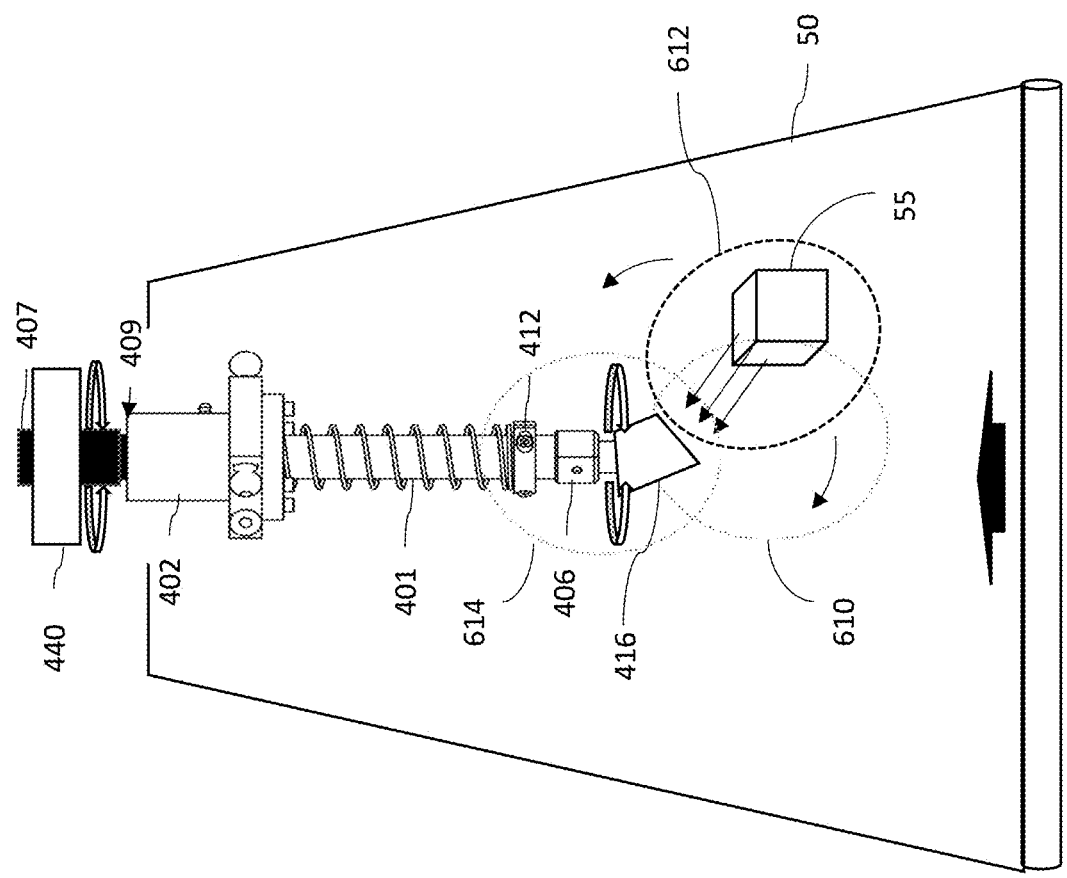

SYSTEMS AND METHODS FOR AN ARTICULATED SUCTION GRIPPER ASSEMBLY

CROSS-REFERENCE TO RELATED APPLICATIONS

This application is a U.S. patent application claiming priority to, and the benefit of, U.S. Provisional Patent Application No. 62/838,746, titled "SYSTEMS AND METHODS FOR A TELESCOPING SUCTION GRIPPER ASSEMBLY" filed on Apr. 25, 2019, which is incorporated herein by reference in its entirety.

BACKGROUND

In many automated sorting systems, objects are transported on a conveyor (such as, but not limited to, a conveyor belt) and sorting robots identify and/or select objects to be removed from the conveyor. For example, in a mail package sorting facility, robots using vacuum activated suction grippers may grab hold of a package using the suction gripper, and then relocate the package to another conveyor or sorting bind. Generally speaking, the shapes of such packages are generally predictable (for example, having easily-defined regular box, envelope or cylindrical shapes). Because of this predictability, the suction grippers may be specifically designed to interface with such objects to form a quasi-complete seal that is sufficient to allow the gripper to exert the necessary suction force to hold the object using only a minimal airflow.

In other types of sorting facilities however, such as waste and recycling sorting facilities, the objects that must be sorted are not nearly as likely to have predictable and easily-defined regular shapes. Consequently, the ability for a generic suction gripper to predictably obtain a quasi-complete seal with any particular object is diminished. One way to address this problem is to compensate for the less complete seal by increasing the volumetric airflow of the vacuum at the suction gripper to the degree necessary to secure a hold on the object. Doing so requires a corresponding increase in the size of the flexible tubing that connects the suction gripper to the vacuum source so that the desired volumetric airflow can be achieved. The use of larger tubing, however, creates additional problems. For example, larger tubing has more mass which increases the load burden on the sorting robot that positions the suction gripper. Larger tubing requires correspondingly larger tubing support and routing fixtures, each of which have mass that increases the load burden on the sorting robot. Larger tubing reduces the free space available for the sorting robot to maneuver its appendages, increasing the likelihood of binding or kinks in the tubing or interference with robot motions. Moreover, operation of the robotic appendages that position the suction gripper require very rapid positioning and re-positioning such that the larger tubing material may experience inertial forces that have a detrimental effect on the tubing material wear and rate of deterioration.

For the reasons stated above and for other reasons stated below which will become apparent to those skilled in the art upon reading and understanding the specification, there is a need in the art for systems and methods for an articulated suction gripper assembly.

SUMMARY

In one embodiment, a robotic system comprises: a robot comprising a robotic actuator and at least one robotic arm mechanically coupled to the robotic actuator; a suction gripper mechanism that comprises: a linear shaft element; an internal airflow passage within the linear shaft configured to communicate an airflow between an airflow application port at a first end of the linear shaft and a gripping port positioned at an opposing second end of the linear shaft; a suction cup assembly comprising a suction cup element coupled to the gripping port; and an actuator configured to rotate the linear shaft in order to articulate an orientation of the suction cup assembly.

DRAWINGS

Embodiments of the present disclosure can be more easily understood and further advantages and uses thereof more readily apparent, when considered in view of the description of the preferred embodiments and the following figures in which:

FIGS. 4A, 4B and 4C are diagrams illustrating an example embodiment of a suction gripper mechanism in combination with an suction cup tool changer.

FIG. 6 is a diagram illustrating an example of suction gripper mechanism axial rotation control in conjunction with a rotational actuator for one embodiment of the present disclosure.

In accordance with common practice, the various described features are not drawn to scale but are drawn to emphasize features relevant to the present disclosure. Reference characters denote like elements throughout figures and text.

DETAILED DESCRIPTION

In the following detailed description, reference is made to the accompanying drawings that form a part hereof, and in which is shown by way of specific illustrative embodiments in which the embodiments may be practiced. These embodiments are described in sufficient detail to enable those skilled in the art to practice the embodiments, and it is to be understood that other embodiments may be utilized and that logical, mechanical and electrical changes may be made without departing from the scope of the present disclosure. The following detailed description is, therefore, not to be taken in a limiting sense.

Embodiments of the present disclosure address the deficiencies of the prior art by introducing a telescoping and/or articulated suction gripper assembly for use with robotic sorting systems and other applications. As described in greater detail below, the telescoping suction gripper assembly includes a telescoping member whose component elements provide a sealed conduit to establish and maintain a vacuum produced suction force at robotically positioned suction gripper, even while the position of the suction gripper is being rapidly extended and retracted. Such embodiments avoid the need to secure and route flexible tubing thus avoiding the kinking, binding and interference issues discussed above. Moreover, the articulation and rotational elements of the telescoping assembly enables quick-change of wear components, such as the replaceable suction cup.

Figure 1:
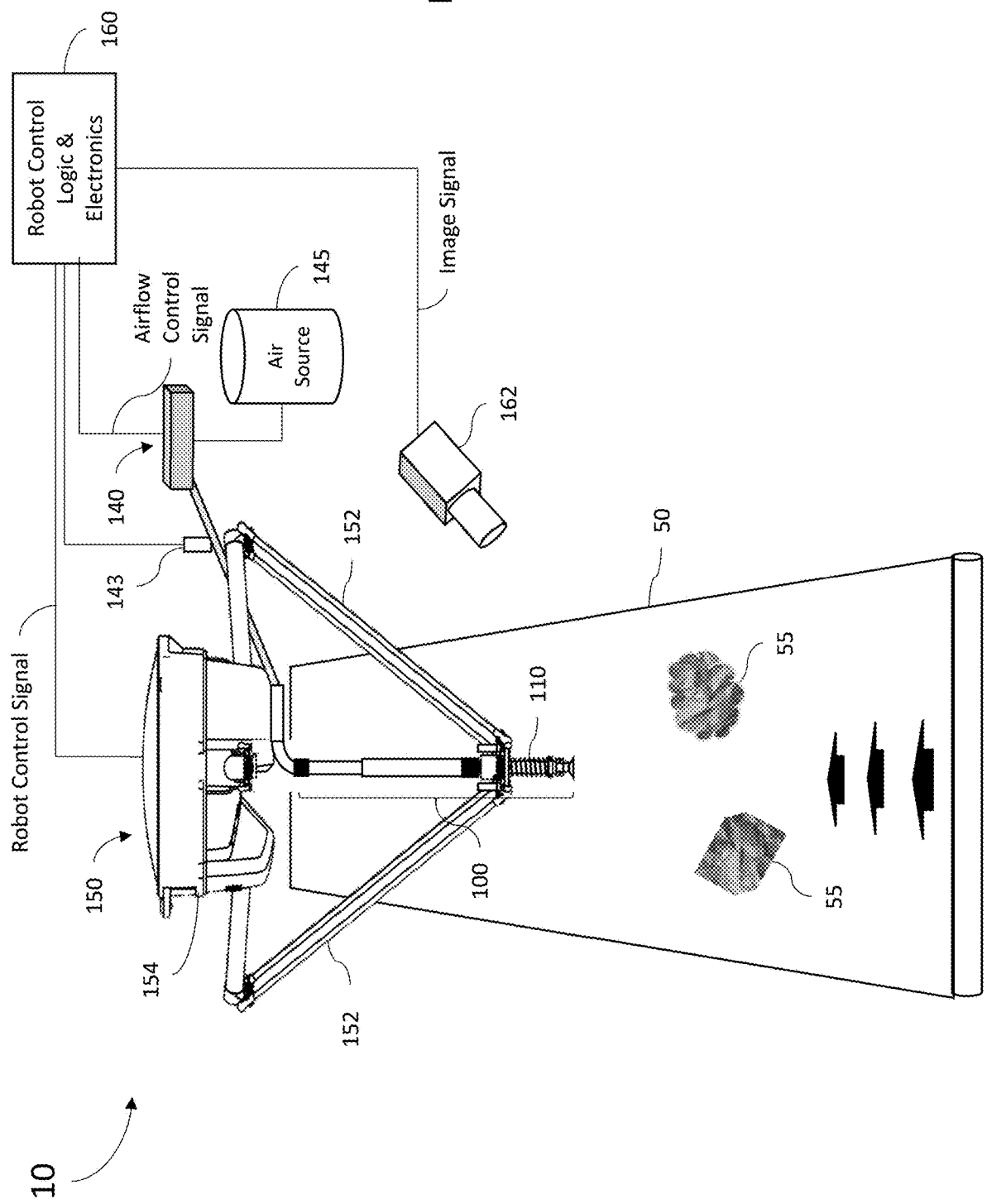
FIG. 1 is a diagram illustrating an example robotic vacuum sorting system of one embodiment of the present disclosure.

FIG. 1 is a diagram illustrating an example robotic vacuum sorting system 10 of one embodiment of the present disclosure. As shown in the example of FIG. 1, a suction gripper mechanism 110 of a telescoping suction gripper assembly 100 is pivotally mounted to a lower base of a sorting robot 150 and driven to desired positions by one or more arms 152 of the sorting robot. As the term is used herein, a robot refers to a mechanical apparatus controlled by a controller (for example, a computer or other logic processor) that used to automatically perform physical tasks. In the embodiment of FIG. 1, the sorting robot 150 it utilized to position the suction gripper mechanism 110 and airflows generated through the suction gripper mechanism 110 are controlled to capture and release target objects. A target object, as the term is used herein, refers to a physical object that is the target of a capture action (i.e., a physical object that has been identified for capture by the system).

In some embodiments, system 10 may supply airflow to the suction gripper 110 via vacuum system 140. In some embodiments, the vacuum system 140 may be further pneumatically coupled to an air source 145, which may comprise of a blower, an air compressor, a compressed air storage tank, or some combination thereof. Although this disclosure may refer to "air" with regards to "airflow", "air compressor" and other elements, it should be understood that the term "air" is used in a generic sense to refer to any compressible gas or minute of gasses. In various alternate embodiments, elements of the vacuum system 140 may be at least partially integral, or mounted, to the sorting robot 150, or may be remotely located way from the sorting robot 150.

In some embodiments, the sorting robot 150 and vacuum system 140 are coupled to and controlled by robot control logic and electronics 160. Robot control logic and electronics 160 may comprise or otherwise be implemented with one or more processors coupled to a memory and programmed to execute code to implement the function attributed to robot control logic and electronics 160 described herein. As such, to communicate control signals, robot control logic and electronics 160 may further comprise elements to generate electrical and/or control pneumatic signals to the sorting robot 150 and vacuum system 140. In some implementations, robotic vacuum sorting system 10 further comprises at least one imaging device 162 (which may comprise, for example, an infrared camera, visual spectrum camera, or some combination thereof) directed at a conveyer mechanism 50 (which may comprise a conveyor belt, for example) that transports target objects (shown at 55) within the operating reach of the sorting robot 150. The imaging device 162 produces an image signal that is delivered to the robot control logic and electronics 160 and which may be used by robot control logic and electronics 160 to send control signals to the sorting robot 150 to position the suction gripper 110, and send airflow control signals to the vacuum signal 140, in order to initiate a capture action, as further described below. In some embodiments, the robotic vacuum sorting system 10 may also comprise a sensor 143 (such as, but not limited to a pressure sensor) providing a signal to the robot control logic and electronics 160 so that it may confirm vacuum is successfully achieved.

For the example embodiment of FIG. 1, an actuator 154 (which may be referred to as a robotic actuator) controls the position of the arms 152 (which may be referred to as robotic arms) in response to control signals from the robot control logic and electronics 160 in order to control the position of the suction gripper mechanism 110. In some embodiments, the distal end of the robotic arms 152 may be configured to engage with mounting points on the suction gripper mechanism 110. Although the sorting robot 150 shown in FIG. 1 is shown as comprising two robotic arms 152, it should be appreciated that in other implementations, sorting robot 150 may comprise any number of one or more robotic arms 152.

Figure 2:
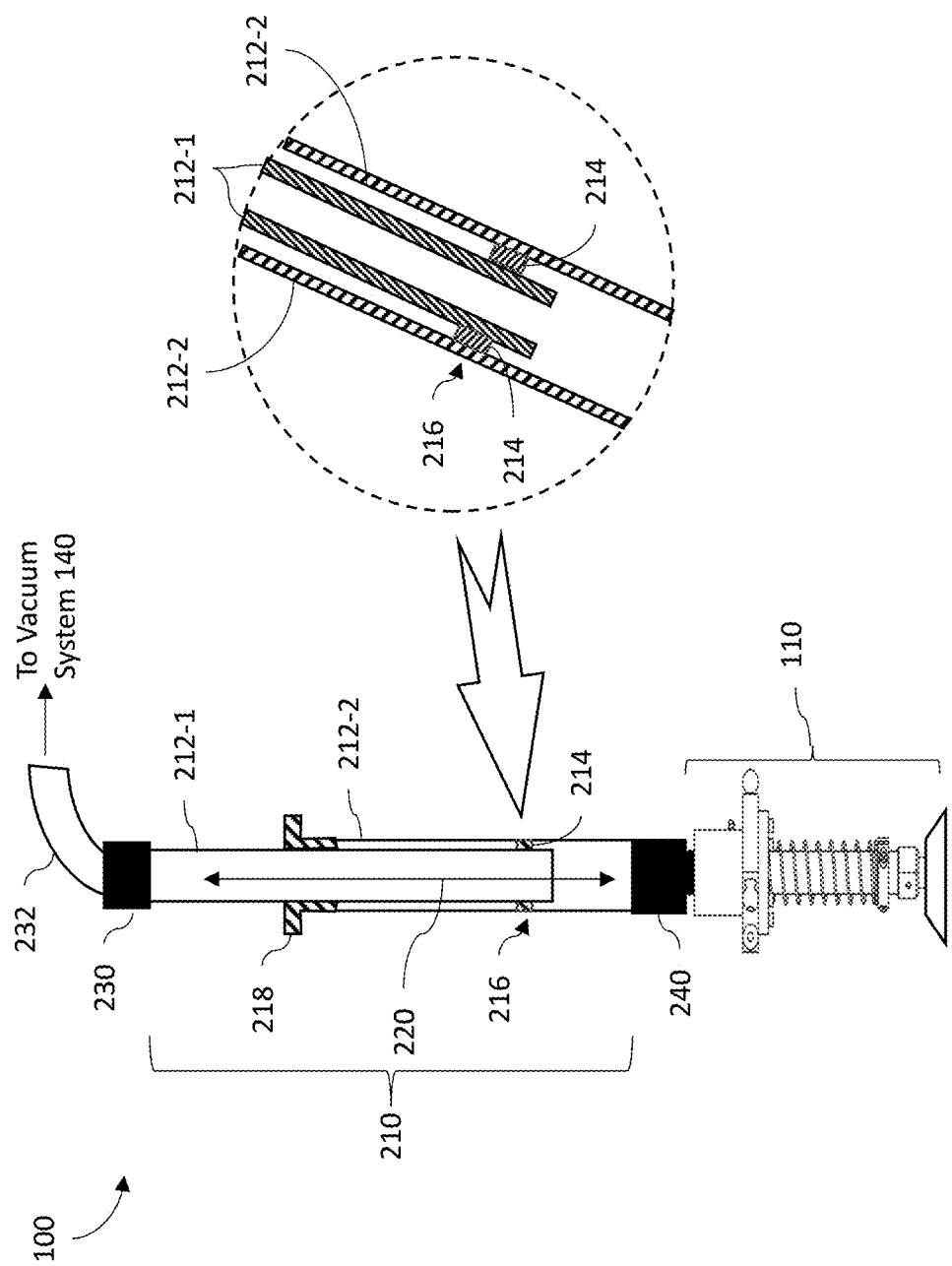
FIG. 2 is a diagram illustrating an example telescoping suction gripper assembly of one embodiment of the present disclosure.

Referring to FIG. 2, one example of the telescoping suction gripper assembly 100 is shown as comprising a telescoping member 210 that includes a plurality of pipes 212 (shown as 212-1 and 212-2). In the particular embodiment shown in FIG. 1, the telescoping member 210 comprises two pipes 212, wherein a first pipe 212-1 has an outer diameter sized and shaped to fit inside a second pipe 212-2. It should be understood that in other embodiments, the telescoping member 210 may comprise two or more pipes 212 having their respective inner and outer diameters sized to similarly provide for telescoping extension and retraction actions as described herein.

In one embodiment, the first pipe 212-1 may comprise a radially and axially rigid tube or pipe structure configured to fit inside of a second radially and axially rigid second pipe 212-2. A seal material 214 is utilized to form a seal 216 between the inner diameter of the larger-diameter pipe 212-2 and the outer diameter of the relatively smaller inner pipe 212-1. For embodiments where the telescope member 210 comprises two or more segments of pipes, each adjacent neighboring pipe segment would be similarly configured and may comprise sealing material between the inner diameter of the larger-diameter pipe and the outer diameter of the relatively smaller inner pipe, in the same fashion. As such, a substantially airtight passageway 220 is formed between the suction gripper mechanism 110 and the vacuum system 140 even as the telescoping member 210 extends and retracts during operation of the sorting robot 150. The particular dimensions of the pipes, particularly the inner diameters that define the airtight passageway 220, may be readily determined by one of ordinary skill in the art who has studied this disclosure based on a function of the volumetric cubic feet per minute that the telescoping suction gripper assembly 100 is designed to carry. It should be understood that although FIG. 2 illustrates an arrangement where the larger-diameter pipe 212-2 of the telescope member 210 is coupled to the suction gripper mechanism 110 and the relatively smaller inner pipe 212-1 coupled to the vacuum system 140, in other embodiments this arrangement can be reversed with the larger-diameter pipe 212-2 of the telescope member 210 coupled to vacuum system 140 and the relatively smaller inner pipe 212-1 coupled to the suction gripper mechanism 110.

Axial alignment between the pipes 212-1 and 212-2 may be maintained during extension and retraction operations of the telescoping member 210 by the combination of the seal material 214 and a bushing 218 (which may be implemented using a flange bearing) that seals the end of the larger pipe 212-2 where the smaller pipe 212-1 is inserted. In some embodiments, the seal 216 between each neighboring pipe 212 of the telescoping member 210 may be formed using a low friction seal material 214, so that the seal 216 functions as sliding seal in both the axial direction, and with respect to rotation about the axis of the telescoping member 210. In some embodiments, the low friction seal material 214 may comprise a packing seal material, for example, a material comprising a carbon impregnated thread filament or other material impregnated with carbon or graphite. The bushing 218 may comprise a low friction material such as a nylon material or ultra-high molecular weight polyethylene, or low friction wear-resistant Polytetrafluoroethylene (PTFE) or Teflon material. In some embodiments, the coefficient of kinetic friction ($\mu_k$) and/or coefficient of static friction ($\mu_s$) for the seal material 214 and/or bushing 218 are sufficiently low to facilitate unbinding motion. As a non-limiting example, in some embodiments the $\mu_k$ and/or $\mu_s$ for the seal material 214 and/or bushing 218 may be less than or equal to 0.2. As explained in greater detail below with respect to FIGS. 3A, 3B and 3C, as the distance between the robot actuator 154 and the gripper 110 changes, the two or more rigid nested pipes 212 are allowed to translate relative to each other along their axial direction. Axial alignment of the pipes 212 is maintained by the seal material 214 and the bushing 218. One or more of the pipes 212 of the telescoping member 210 thus may translate with respect to each other in both the axial and rotational directions while maintaining an airtight seal.

In some embodiments, a flexible conduit member 230 is coupled to the upper end of the telescoping member 210 to form a flexible airtight connection between the telescoping member 210 and a vacuum supply conduit 232. The vacuum supply conduit 232 is coupled to the vacuum system 140 so that an airflow generated by the vacuum system 140 (having either positive or negative airflow pressure) is communicated through to the telescoping member 210 and suction gripper mechanism 110. In some embodiments, the vacuum supply conduit 232 may be rigidly mounted to a surface of the sorting robot 150, or to another structure associated with the sorting robot 150. This upper flexible conduit member 230 permits the telescoping member 210 to pivot as the telescoping suction gripper assembly 100 is operated, and accommodates axial misalignment between the telescoping member 210 and the vacuum supply conduit 232.

As shown in FIG. 2, the telescoping suction gripper assembly 100 may also comprise a second, or lower, flexible conduit member 240. The flexible conduit member 240 is coupled to the lower portion of the airflow passage 220 of the telescoping member 210 to form a flexible airtight connection between the telescoping member 210 and the suction gripper mechanism 110. This lower flexible conduit member 240 permits this lower portion of the telescoping member 210 to pivot about the suction gripper mechanism 110 as the telescoping suction gripper assembly 100 is operated, and accommodates axial misalignment between the telescoping member 210 and the suction gripper mechanism 110.

In operation, the robot control logic and electronics 160 may be programmed to operate both the robotic arms 152 and the vacuum system 140 in a coordinated manner to perform what is referred to herein as executing a "capture action" or a "pick" on a target object 55. In some embodiments, in operation, a capture action comprises at least positioning the suction gripper mechanism 110 to aim at a target object 55, activating the vacuum system 140, and controlling the sorting robot 150 to move the suction gripper mechanism 110 towards the target object 55 to make contact while applying a vacuum to the surface of the target object 55. As this occurs, the telescoping suction gripper assembly 100 will self-adjust in length as needed in reaction to pulling or pushing forces placed upon it by the movement of the suction gripper mechanism 110. The response of the telescoping suction gripper assembly 100 in reconfiguring itself during the execution of such capture actions is illustrated by example in FIGS. 3A, 3B and 3C.

Figure 3A:
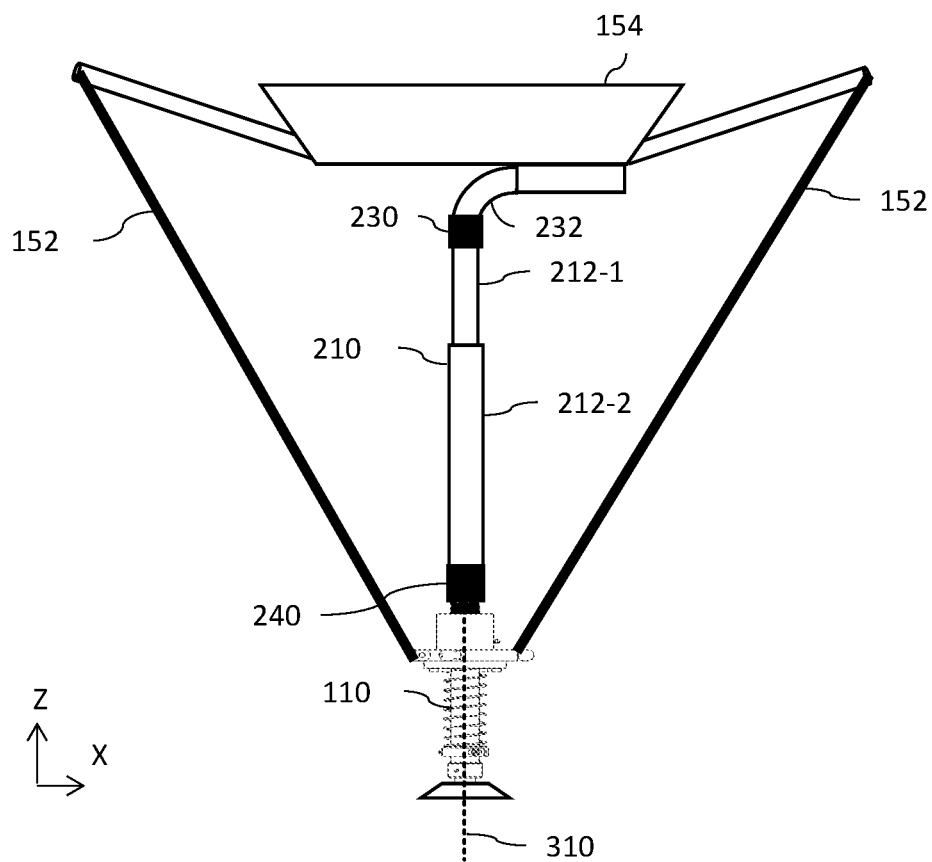
FIGS. 3A, 3B and 3C are diagrams illustrating the operation of an example telescoping suction gripper assembly in combination with a sorting robot for one embodiment of the present disclosure.
Figure 3B:
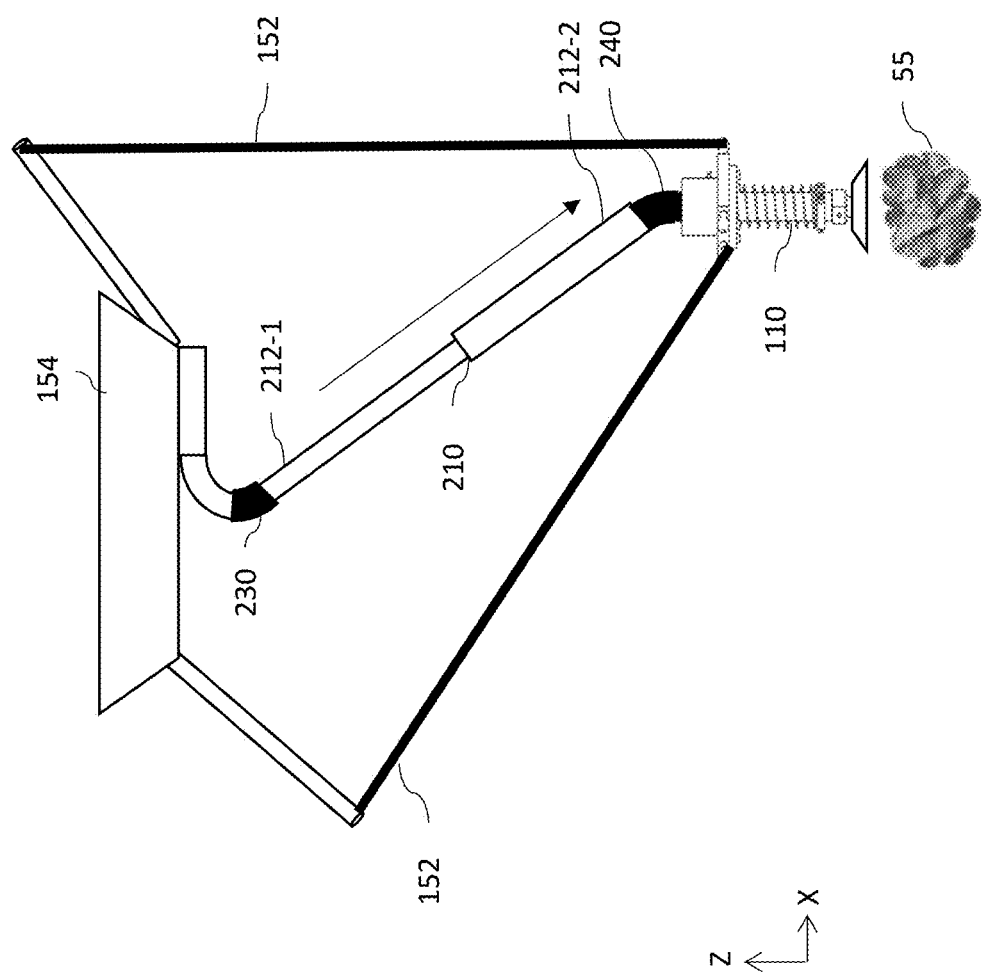
Figure 3C:
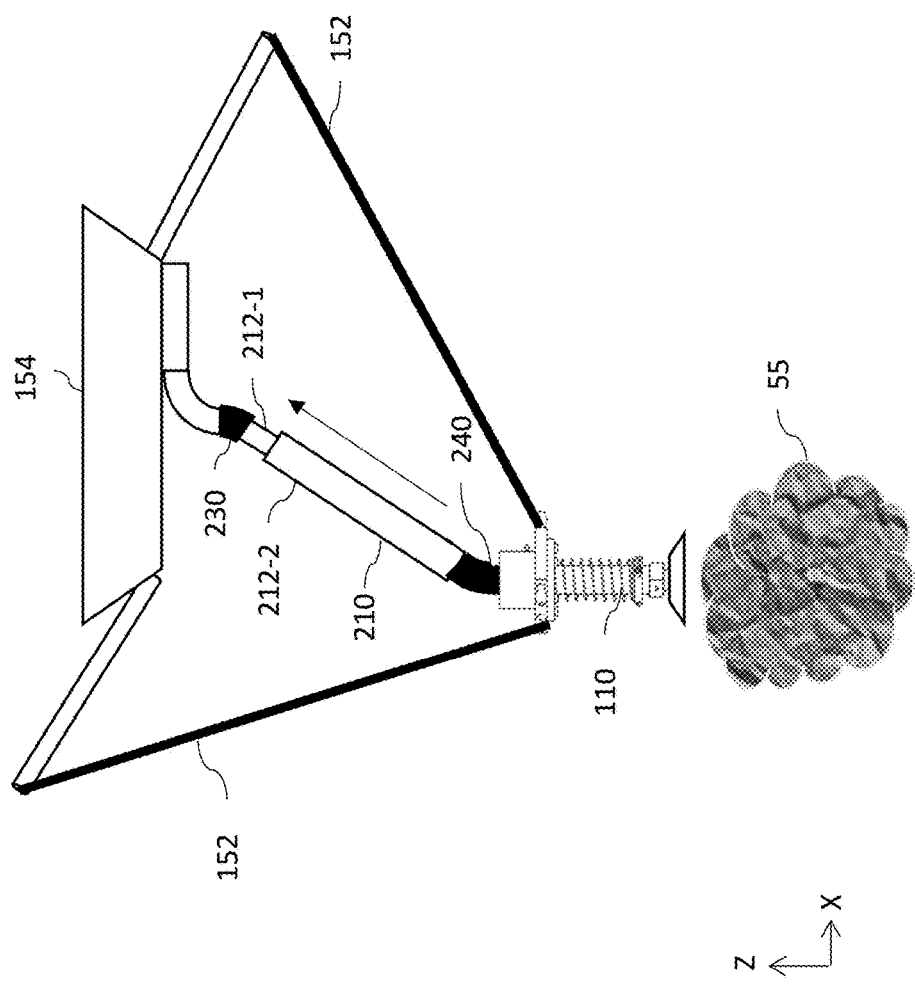

FIG. 3A illustrates the suction gripper mechanism 110 in an example "neutral" or "stand-by" position, for example between capture actions. In this example neutral position, the telescoping member 210 may be neither fully extended nor fully retracted. In some embodiments, operation of the robot arms 152 are controlled by the actuator 154 so that the orientation of the axis 310 of the suction gripper mechanism 110 remains constant. As the actuator 154 controls the robot arms 152 to reach for a target object 55, the motion causes the telescoping member 210 to extend in length as shown in FIG. 3B. The vacuum system 140 is controlled (by the robot control logic & electronics 160) to pull an airflow through the telescoping suction gripper assembly 100 so that a vacuum force at the suction gripper mechanism 110 is exerted to capture and hold the target object 55 (for removal from the conveyor 50, for example). In some embodiments, at the completion of each capture action, the robot control logic and electronics 160 controls the vacuum system 140 to optionally reverse the airflow through the suction gripper mechanism 110 so that a positive air is flowing out. Airflow reversal may serve not only to release and/or propel the target object 55 from the suction gripper mechanism 100, but also may serve purge dust from the telescoping suction gripper assembly 100 and/or vacuum system 140 as well as expel other materials (such as plastic bags or wraps) that may have been drawn into the internal airflow passage 220. FIG. 3C, in contrast to FIG. 3B, illustrates a retracted telescoping member 210 configuration, where there may be a minimum distance between the robot actuator 154 and the suction gripper mechanism 110. Such a retracted configuration may occur during a capture action where the target object 55 is relatively tall and the suction gripper mechanism 110 must be raised (e.g. above the neutral position) in order to be in position to capture and hold the target object 55, or in order to propel an already captured target object 55 from the conveyor 50. In this manner, the telescoping action of the telescoping suction gripper assembly 100 allows the sorting robot 150 to overcome the deficiencies of the prior art by allowing the uninterrupted delivery of high suction airflows to the suction gripper mechanism 110, at whatever position the sorting robot 150 needs to place the suction gripper mechanism 110 in order to capture and hold the target object 55, without interfering with the motion of the robot arms or experiencing tubing kinks, tears, or other tubing calamities.

Figure 4:
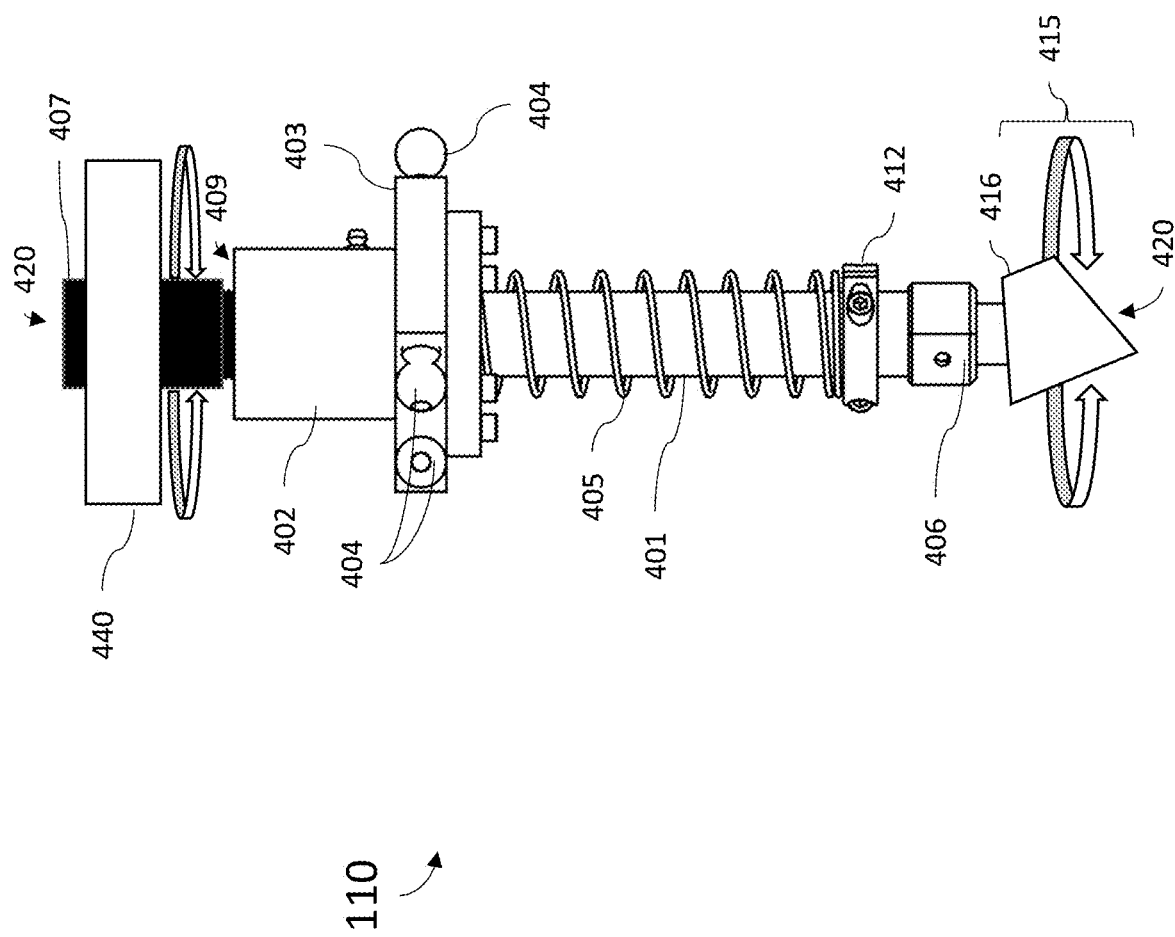
FIG. 4 is a diagram illustrating an example suction gripper mechanism for one embodiment of the present disclosure.

FIG. 4 is a diagram illustrating a side view of an example suction gripper mechanism 110 of one embodiment of the present disclosure such as described with respect to FIG. 1. In this particular example embodiment, the suction gripper mechanism 110 comprises a body assembly 402 that houses a linear bearing component 409, and a mounting assembly 403 rigidly secured around the body assembly 402 that houses the linear bearing component 409.

In one embodiment, the mounting assembly 403 comprises a ring shaped assembly having a through hole through which the linear bearing component 409 is positioned and securely attached. In some embodiments, the mounting assembly 403 and the body assembly 402 may be rigidly coupled together such as through a weld or mechanical fastener. In some embodiments, the mounting assembly 403 and body assembly 402 may comprise a single integrated part. In this example embodiments, the mounting assembly 403 further comprises one or more mounting points 404 via which the mounting assembly 403 may be pivotally coupled to the robot arms 152 of the sorting robot 150.

In this example embodiment, the suction gripper mechanism 110 may further comprise a linear shaft element 401 secured within the linear bearing 409 and having a freedom to travel axially up and down with respect to the axis of the linear bearing 409. The linear shaft 401 comprises an internal airflow passage 420 configured to communicate an airflow (having either a positive or negative air pressure) between an airflow application port 407 positioned at a first end of the linear shaft 401 and a gripping port 406 positioned at the opposing second end of the linear shaft 401. The airflow application port 407 may be coupled to the telescoping member 210 by the lower flexible conduit member 240 to establish communication between the internal airflow passage 420 of the suction gripper mechanism 110 and the airflow passage 220 of the telescoping member 210. In some embodiments, a spring mechanism 405 may be positioned between the mounting assembly 403 and a stop device 412 located near the distal second end of the linear shaft 412 proximate to the gripping port 406, to hold the linear shaft 401 in a fully extended position when the suction gripper 110 is not holding a target object 55. When contact is made with the target object 55, the force of contact will cause the bottom end of linear shaft 401 to slide up into the linear bearing 409 (which will correspondingly cause the opposing top end of the linear shaft 401 to slide out from the linear bearing 409) and the spring mechanism 405 to compress. In this way, target objects of various dimensions can be accommodated without causing damage to components of the robot 150 from the force of impact. When the capture action is complete and the vacuum deactivated by the robot control logic and electronics 160, the spring mechanism 405 will extend the linear shaft 401 back to its fully extended position. A suction cup assembly 415 can be attached to the gripping port 406. In some embodiments, the suction cup assembly may comprise a flexible cup element 416 (which may be a rubber, latex, or other flexible material).

In some embodiments, the linear shaft 401 may also have a freedom of movement to rotate around the linear axis through the linear bearing 409. To address such embodiments (or other embodiments where components of the suction gripper 110 may axially rotate), the telescoping member 210 may accommodate this rotation without causing a binding of the telescoping suction gripper assembly 100 because the low friction characteristics of the seal material 214 and bushing 218 allow the pipe 212 segments of the telescoping member 210 to rotate with respect to each other. In some embodiments, the telescoping suction gripper assembly 100 may actively control the angle of rotation of the linear shaft 401 and/or suction cup assembly 415. For example, in one embodiment the telescoping suction gripper assembly 100 or suction gripper mechanism 110 may further comprise an actuator 440 to rotate the linear shaft 401 in order to articulate the orientation of the suction cup assembly 415 to better facilitate a capture action on a target object 55. Such an actuator 440 may be implemented, for example, using an electric motor coupled to the linear shaft 401 (for example, by gears, belts or other means) that is controlled by the logic and electronics 160 or other programmable logic controller (PLC).

In other embodiments, the rotation of the suction cup assembly 415 may be controlled by an actuator 440 in order to facilitate automatic replacement of the flexible cup element 416. For example, as shown in FIG. 4A, the robot control logic and electronics 160 may reposition and insert the suction gripper mechanism 110 partially inserted into a tool changer 480 that hold the flexible cup element 416 while rotation of the suction cup assembly 415 by actuator 440 causes the flexible cup element 416 to release from the suction gripper mechanism 110. The robot control logic and electronics 160 may then reposition the suction gripper mechanism 110 to accept a new flexible cup element 416 from the tool changer 480. Actuator 440 may then rotate the suction cup assembly 415 to cause the new flexible cup element 416 to secure to the suction gripper mechanism 110. Flexible cup element 416 replacement may be performed, for example, to replace a damaged or worn flexible cup element 416, or for other reasons such as to replace one flexible cup element 416 with another that is more suited for the particular target objects 55 that need to be captured. For example the replacement flexible cup element 416 may comprise a size, shape, flexibility, material, or other characteristic more suited for a particular target object 55 than the current flexible cup element 416 based on characteristics of the target object 55 determined by the control logic and electronics 160. After characterizing the target object 55, the control logic and electronics 160 may correlate one or more of the determined characteristics with flexible cup element 416 characteristics to make a determination to swap the flexible cup elements.

In some embodiments, an action to replace a suction cup assembly 415 and/or the flexible cup element 416 of a suction cup assembly 415 can initiated by the control logic and electronics 160 based on one or more factors such as, but not limited to, the amount of time a flexible cup element 416 has been installed and in service and/or the number of capture actions a flexible cup element 416 has performed. For example, the control logic and electronics 160 may actuate a timer that keeps track of the amount of service time that the system has been actively operating with a particular flexible cup element 416, and initiate an action to automatically replace the flexible cup element 416 when a service time limit is reached. Alternatively, the control logic and electronics 160 may implement a counter that keeps track of the number of capture actions that have occurred with a particular flexible cup element 416, and initiate an action to automatically replace the flexible cup element 416 when a threshold count limit is reached.

In other embodiments, an action to automatically replace the flexible cup element 416 may instead be initiated based on a quality metric or sensor inputs assessed by the control logic and electronics 160. For example, the control logic and electronics 160 may detect an increasing trend in the number of unsuccessfully capture actions, or similar quality statistic, and initiate an action to automatically replace the flexible cup element 416. Such an unfavorable trend may be cause by a ripped, punctured, clogged or contaminated flexible cup element 416 so that replacement of such a degraded flexible cup element 416 may correct the issue causing the unsuccessful capture actions. In another embodiment, the control logic and electronics 160 may utilize a sensor input, such as measurements from the sensor 143, to determine when the flexible cup element 416 might be clogged or at least partially blocked, and initiate an action to automatically replace the flexible cup element 416 based on that determination. Alternatively, in some embodiments, the control logic and electronics 160 may initiate an automated cleaning procedure. That is, instead of replacing the flexible cup element 416 when a blockage is detected, the control logic and electronics 160 may move the suction gripper mechanism 110 to a cleaning mechanism 481 and insert the cleaning mechanism 481 into the flexible cup element 416. In some embodiments, the cleaning mechanism 481 may be integrated with, or adjacent to, the tool changer 480. In other embodiments, the cleaning mechanism 481 may be separate from the tool changer 480, or present even in the absence of a tool changer 480. Examples of a cleaning mechanism 481 may include, but are not limited to, a brush, cloth, sponge, wedge, blade, air jet, or other component that can mechanically clean or clear debris from the flexible cup element 416. In some embodiments, the control logic and electronics 160 may activate the actuator 440 to rotate the flexible cup element 416 as the cleaning mechanism 481 removes debris.

In some embodiments, as shown in FIG. 4B the gripping port 406 may comprise a threaded interface 450 with the suction cup assembly 415 comprising a compatible threaded interface 451 such that rotation of the gripping port 406 by operation of the actuator 440 will cause the two interfaces 450, 451 to couple or de-couple depending on the direction the gripping port 406 is rotated by the actuator 440. In other embodiments, instead of being threaded, these interfaces 450, 451 may instead comprise, for example, cam connectors, pin-and-slot connectors, quarter-turn latching connectors, or other mechanical latching interfaces that can be quickly engaged and disengaged such as by applying quick rotational manipulations.

In still other embodiments, the interfaces 450, 451 may instead comprise components of a locking grasping mechanism 455 as shown in FIG. 4C. In this embodiment, the interface 450 of the gripping port 406 comprises one or more articulating latching members 456 (such as pins or fingers, for example) that engage with one or more corresponding latching points 457 that comprise the interface 451 of the suction cup assembly 415. In some embodiments, activation of the actuator 440 to rotate the gripping port 406 may engage a linkage to cause the articulating latching members 456 to engage and/or release from the latching points 457.

Although the locking grasping mechanism 455 is shown as comprising a set of three articulating latching members 456 and corresponding latching points 457, it should be understood than in other embodiments, it may comprise a greater or fewer numbers of each. In some embodiments, the articulating latching members 456 engage and lock with the corresponding latching points 457 in response to a rotation applied by the actuator 440 to rotate the gripping port 406 or other component. In some embodiments, the articulating latching members 456 may function to pull the corresponding latching points 457 (and thus the suction cup assembly 415) in towards the gripping port 406 and lock it into place during installation of a new suction cup assembly 415. In other embodiments, the articulating latching members 456 may operate to eject or repel the corresponding latching points 457 (and thus the suction cup assembly 415) away during an deinstallation of a used suction cup assembly 415/flexible cup element 416.

Figure 5:
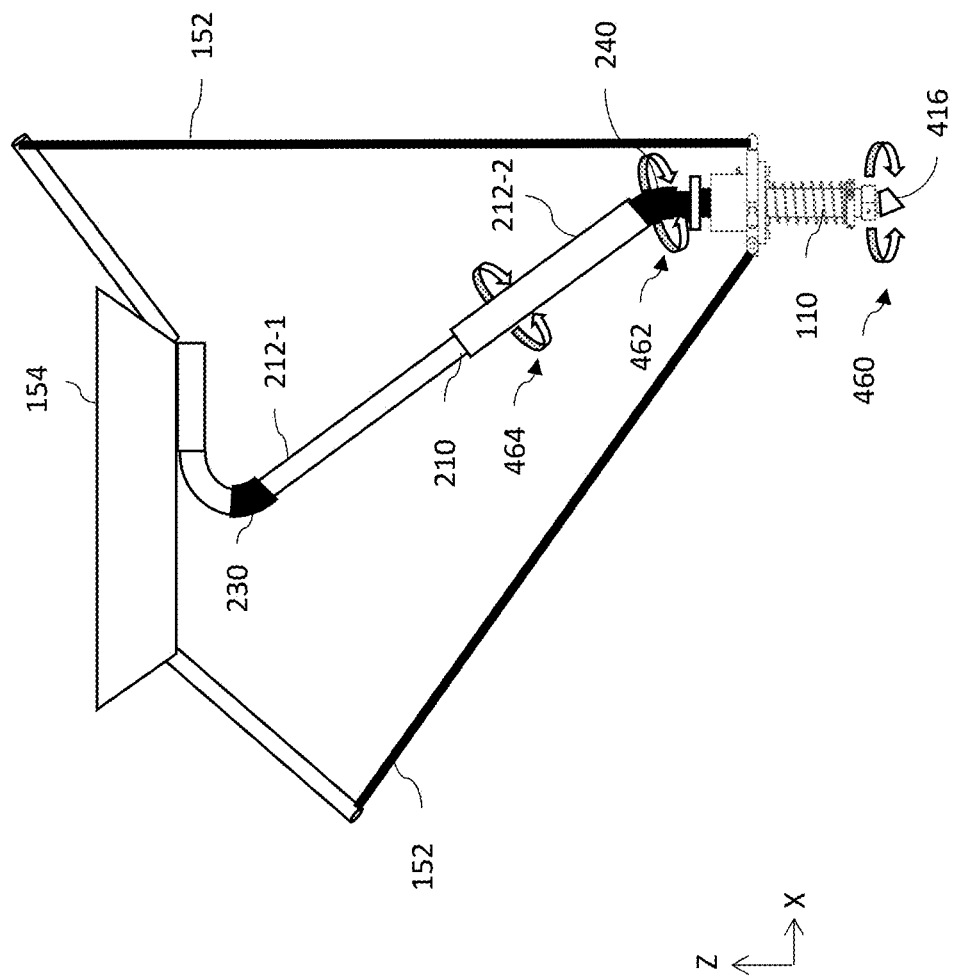
FIG. 5 is a diagram illustrating an example of suction gripper mechanism axial rotation in conjunction with a telescoping suction gripper assembly for one embodiment of the present disclosure.

As illustrated in FIG. 5, the design of the telescoping suction gripper assembly 100, particularly the telescoping member 210, facilitates such rotational movements of the suction gripper mechanism 110. The rotational movement at the suction gripper mechanism 110 (shown at 460) is translated into the telescoping member 210 by the flexible conduit member 240 (shown at 462), and the low friction characteristics of the seal material 214 and bushing 218 allow the pipe 212 segments (e.g. 212-2 and 212-2) of the telescoping member 210 to rotate with respect to each other (as shown at 464).

FIG. 6 illustrates another embodiment where a rotation applied by the actuator 440 to the gripping port 406 may be utilized to further control the directionality of the airflow induced vacuum force used by the suction gripper mechanism 110 to capture and hold a target object 55. For example, the suction cup assembly 415 and/or flexible cup element 416 may be angled or otherwise designed with an offset or rotational element that provides direction control of the airflow. As discussed above, in some embodiments an imaging device 162 produces an image signal that is delivered to the robot control logic and electronics 160 and which may be used by robot control logic and electronics 160 to send control signals to the sorting robot 150 to position the suction gripper 110 in order to initiate a capture action. In the embodiment of FIG. 6, the positioning logic of the control logic and electronics 160 may be augmented to further include control of the actuator 440 during a capture action in order to orient the directionality of the suction gripper mechanism 110 airflow with respect to a target object 55 to increase the vacuum force's effect on the target object 55. In other words, instead of the robot control logic and electronics 160 positioning the suction gripper 110 immediately above a target object 55, the positioning obtained by the robot control logic and electronics 160 can be offset from the target object 55 with a more fine control of the vacuum force directionality obtained by operating the actuator 440. Although FIG. 6 illustrates direction control of the suction cup assembly 415 and/or flexible cup element 416 to capture a target object 55 having a lateral offset 612 with respect to the suction gripper mechanism 110 (shown at 612), in other instances the direction control of the suction cup assembly 415 and/or flexible cup element 416 may be utilized to capture a target object 55 in front of the suction gripper mechanism 110 (shown at 610) or that has already passed the suction gripper mechanism 110 (shown at 614). Such embodiments may be advantageous where the sorting robot 150 or other mechanism used to position the suction gripper mechanism 110 is limited in precision, speed, or reach, or simply to provide an addition degree-of-freedom to capture and eject an object. It should be understood that in some embodiments, rotation applied by the actuator 440 may also be utilized when a captured target object is released, or when the airflow through the suction gripper mechanism 110 is reversed, to control the direction in which the captured target object is ejected.

Although several of the figures described herein disclose a suction gripper mechanism 110 comprising an actuator 440 for providing rotational functionality that are used in combination with a telescoping member 210 coupled into the airflow path to the vacuum system 140, it should be understood that for any of these embodiments the inclusion of such a telescoping member 210 is optional. As such, variants of embodiments of those described herein include any such systems and mechanism that omit the telescoping member 210.

EXAMPLE EMBODIMENTS

Example 1 includes a robotic system, the system comprising: a robot comprising a robotic actuator and at least one robotic arm mechanically coupled to the robotic actuator; a suction gripper mechanism that comprises: a linear shaft element; an internal airflow passage within the linear shaft configured to communicate an airflow between an airflow application port at a first end of the linear shaft and a gripping port positioned at an opposing second end of the linear shaft; a suction cup assembly comprising a suction cup element coupled to the gripping port; and an actuator configured to rotate the linear shaft in order to articulate an orientation of the suction cup assembly.

Example 2 includes the system of example 1, wherein the suction cup element comprises a flexible suction cup.

Example 3 includes the system of any of examples 1-2, the suction gripper mechanism further comprising: a body assembly that houses a linear bearing component, wherein the linear shaft element is secured within the linear bearing and has a freedom to travel axially up and down with respect to an axis of the linear bearing.

Example 4 includes the system of example 3, wherein the linear shaft and suction cup assembly are configured with a freedom to rotate about the axis of the linear bearing.

Example 5 includes the system of any of examples 1-4, further comprising: a reversible vacuum system coupled to the suction gripper mechanism; robot control logic and electronics coupled to the robot, the actuator, and the reversible vacuum system, wherein the robot control logic and electronics outputs one or more control signals to control the at least one robotic arm and the actuator, and outputs one or more airflow control signals to the reversible vacuum system.

Example 6 includes the system of example 5, wherein the robot control logic and electronics coordinates the one or more control signals and the one or more airflow control signals to execute a capture action on at least one target object.

Example 7 includes the system of any of examples 5-6, wherein the robot control logic and electronics controls the actuator to rotate a direction of the suction cup assembly based on an image signal from an imaging device.

Example 8 includes the system of any of examples 5-7, further comprising a tool changer; wherein the robot control logic and electronics controls is configured to insert at least a portion of the suction gripper mechanism into the tool changer and engage the actuator to rotate the linear shaft element in order to replace the suction cup assembly.

Example 9 includes the system of example 8, wherein the robot control logic and electronics controls is configured to determine when to replace the suction cup assembly based on either a number of capture actions performed or an amount of time the suction cup assembly has been in service.

Example 10 includes the system of any of examples 8-9, further comprising a sensor coupled to the control logic and electronics, wherein the control logic and electronics is configured to detect when the suction cup assembly is at least partially blocked based on a signal from the sensor; wherein the robot control logic and electronics controls is configured to determine when to replace the replace the suction cup assembly based on a determination that the suction cup assembly is at least partially blocked.

Example 11 includes the system of example 10, wherein the robot control logic and electronics controls is configured to determine a quality metric with respect to capture actions; wherein the robot control logic and electronics controls is configured to determine when to replace the replace the suction cup assembly based the quality metric.

Example 12 includes the system of any of examples 1-11, further comprising: robot control logic and electronics coupled to the robot and the actuator, wherein the robot control logic and electronics outputs one or more control signals to control the at least one robotic arm and the actuator; and a cleaning mechanism, wherein the robot control logic and electronics controls is configured to insert at least a portion of the suction gripper mechanism into the cleaning mechanism and engage the actuator to rotate the linear shaft element in order to clean the suction cup assembly.

Example 13 includes the system of any of examples 1-12, wherein the gripping port comprises a first interface and the suction cup assembly comprises a second interface; wherein the first interface and the second interface are configured to engage with each other to couple the suction cup assembly to the gripping port.

Example 14 includes the system of example 13, wherein the first interface comprises a locking grasping mechanism that includes at least one articulating latching members; wherein the second interface comprises at least one latching point; wherein the at least one articulating latching members is configured to engage with the comprises at least one latching point to secure the suction cup assembly to the gripping port in response to a rotation of the gripping port by the actuator.

Example 15 includes a suction gripper mechanism, the mechanism comprising: a body assembly that houses a linear bearing component; a linear shaft element secured within the linear bearing and having a freedom to travel axially up and down with respect to an axis of the linear bearing; an internal airflow passage within the linear shaft configured to communicate an airflow between an airflow application port at a first end of the linear shaft and a gripping port positioned at an opposing second end of the linear shaft; a suction cup assembly comprising a flexible cup element coupled to the gripping port; and an actuator configured to rotate the linear shaft in order to articulate an orientation of the suction cup assembly.

Example 16 includes the mechanism of example 15, wherein the linear shaft and suction cup assembly are configured with a freedom to rotate about the axis of the linear bearing.

Example 17 includes the mechanism of any of examples 15-16, wherein the body assembly is configured to pivotally coupled to at least one robotic arm of a robot comprising a robotic actuator and the at least one robotic arm.

In various alternative embodiments, system elements, method steps, or examples described throughout this disclosure (such as the sorting robot, robot control logic & electronics, imaging devices, vacuum system, and/or subparts of any thereof, for example) may be implemented using one or more computer systems, field programmable gate arrays (FPGAs), or similar devices and/or comprising a processor coupled to a memory and executing code to realize those elements, processes, steps or examples, said code stored on a non-transient data storage device. Therefore, other embodiments of the present disclosure may include elements comprising program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited to computer-executable instructions executed by computer system processors and hardware description languages such as Very High Speed Integrated Circuit (VHSIC) Hardware Description Language (VHDL).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the presented embodiments. Therefore, it is manifestly intended that embodiments be limited only by the claims and the equivalents thereof.

What is claimed is:

1. A robotic system, the robotic system comprising:
a robot comprising a robotic actuator and at least one robotic arm mechanically coupled to the robotic actuator;
a suction gripper mechanism that comprises:
a linear shaft element;
an internal airflow passage within the linear shaft element configured to communicate an airflow between an airflow application port at a first end of the linear shaft element and a gripping port positioned at an opposing second end of the linear shaft element;
a suction cup assembly comprising a suction cup element coupled to the gripping port; and
an actuator configured to rotate the linear shaft element in order to articulate an orientation of the suction cup assembly;
a reversible vacuum system coupled to the suction gripper mechanism;
a tool changer; and
robot control logic and electronics coupled to the robot, the actuator, and the reversible vacuum system,
wherein the robot control logic and electronics are configured to output one or more control signals to control the at least one robotic arm and the actuator, and to output one or more airflow control signals to the reversible vacuum system; and
wherein the robot control logic and electronics are configured to insert at least a portion of the suction gripper mechanism into the tool changer and engage the actuator to rotate the linear shaft element in order to replace the suction cup assembly.

2. The robotic system of claim 1, wherein the suction cup element comprises a flexible suction cup.

3. The robotic system of claim 1, the suction gripper mechanism further comprising:
a body assembly that houses a linear bearing component, wherein the linear shaft element is secured within the linear bearing component and has a freedom to travel axially up and down with respect to an axis of the linear bearing component.

4. The robotic system of claim 3, wherein the linear shaft element and the suction cup assembly are configured with a freedom to rotate about the axis of the linear bearing component.

5. The robotic system of claim 1, wherein the robot control logic and electronics are configured to coordinate the one or more control signals and the one or more airflow control signals to execute a capture action on at least one target object.

6. The robotic system of claim 1, wherein the robot control logic and electronics are configured to control the actuator to rotate a direction of the suction cup assembly based on an image signal from an imaging device.

7. The robotic system of claim 1, wherein the robot control logic and electronics are configured to determine when to replace the suction cup assembly based on either a number of capture actions performed or an amount of time the suction cup assembly has been in service.

8. The robotic system of claim 1, further comprising a sensor coupled to the robot control logic and electronics, wherein the robot control logic and electronics are configured to detect when the suction cup assembly is at least partially blocked based on a signal from the sensor;
wherein the robot control logic and electronics are configured to determine when to replace the suction cup assembly based on a determination that the suction cup assembly is at least partially blocked.

9. The robotic system of claim 8, wherein the robot control logic and electronics are configured to determine a quality metric with respect to capture actions;
wherein the robot control logic and electronics controls are configured to determine when to replace the suction cup assembly based the quality metric.

10. The robotic system of claim 1, further comprising:
wherein the at least portion of the suction gripper mechanism comprises at least a first portion of the suction gripper mechanism;
a cleaning mechanism, wherein the robot control logic and electronics are configured to insert at least a second portion of the suction gripper mechanism into the cleaning mechanism and engage the actuator to rotate the linear shaft element in order to clean the suction cup assembly.

11. The robotic system of claim 1, wherein the gripping port comprises a first interface and the suction cup assembly comprises a second interface;
wherein the first interface and the second interface are configured to engage with each other to couple the suction cup assembly to the gripping port.

12. The robotic system of claim 11, wherein the first interface comprises a locking grasping mechanism that includes at least one articulating latching member;
wherein the second interface comprises at least one latching point;
wherein the at least one articulating latching member comprises at least one latching point to secure the suction cup assembly to the gripping port in response to a rotation of the gripping port by the actuator.

13. The robotic system of claim 11, wherein the first interface comprises a threaded interface;
wherein the second interface comprises a compatible threaded interface;
wherein the first interface is configured to couple with the second interface to secure the suction cup assembly to the gripping port in response to a rotation of the gripping port by the actuator.

14. A suction gripper mechanism, the suction gripper mechanism comprising:
a body assembly that houses a linear bearing component;
a linear shaft element secured within the linear bearing component and having a freedom to travel axially up and down with respect to an axis of the linear bearing component;
an internal airflow passage within the linear shaft element configured to communicate an airflow between an airflow application port at a first end of the linear shaft element and a gripping port positioned at an opposing second end of the linear shaft element;
a suction cup assembly comprising a first flexible cup element coupled to the gripping port, wherein the first flexible cup element is detachable; and an actuator configured to rotate the linear shaft element in order to articulate an orientation of the suction cup assembly;

wherein the actuator is configured to:

rotate the suction cup assembly to detach the first flexible cup element while the first flexible cup element is being held by a tool changer; and rotate the suction cup assembly to attach a second flexible cup element from the tool changer.

15. The suction gripper mechanism of claim 14, wherein the linear shaft element and suction the cup assembly are configured with a freedom to rotate about the axis of the linear bearing component.

16. The suction gripper mechanism of claim 14, wherein the body assembly is configured to pivotally couple to at least one robotic arm of a robot comprising a robotic actuator and the at least one robotic arm.

17. A robotic system, the robotic system comprising:

a robot comprising a robotic actuator and at least one robotic arm mechanically coupled to the robotic actuator; and a suction gripper mechanism that comprises:

a linear shaft element;

an internal airflow passage within the linear shaft element configured to communicate an airflow between an airflow application port at a first end of the linear shaft element and a gripping port positioned at an opposing second end of the linear shaft element;

a suction cup assembly comprising a suction cup element coupled to the gripping port; and an actuator configured to rotate the linear shaft element in order to articulate an orientation of the suction cup assembly;

wherein the gripping port comprises a first interface and the suction cup assembly comprises a second interface, wherein the first interface and the second interface are configured to engage with each other to couple the suction cup assembly to the gripping port, wherein the first interface comprises a locking grasping mechanism that includes at least one articulating latching member, wherein the second interface comprises at least one latching point, and wherein the at least one articulating latching member comprises at least one latching point to secure the suction cup assembly to the gripping port in response to a rotation of the gripping port by the actuator.

* * * * *

UNITED STATES PATENT AND TRADEMARK OFFICE
CERTIFICATE OF CORRECTION

PATENT NO. : 11,654,581 B2
APPLICATION NO. : 16/856825
DATED : May 23, 2023
INVENTOR(S) : Carter J. Schultz et al.

It is certified that error appears in the above-identified patent and that said Letters Patent is hereby corrected as shown below:

In the Specification

In Column 2, Line(s) 33, delete "an" and insert --a--, therefor.

In Column 3, Line(s) 19, after "that", insert --is--.

In Column 3, Line(s) 20, delete "it" and insert --is--, therefor.

In Column 8, Line(s) 50, delete "cause" and insert --caused--, therefor.

In Column 9, Line(s) 51, delete "an" and insert --a--, therefor.

Signed and Sealed this
Fourteenth Day of November, 2023

Katherine Kelly Vidal
*Director of the United States Patent and Trademark Office*